United States Patent [19]

Miyoshi et al.

[11] Patent Number: 5,052,240
[45] Date of Patent: Oct. 1, 1991

[54] STRUCTURAL ARRANGEMENT FOR SUPPORTING A TILT STEERING DRIVE

[75] Inventors: Keisuke Miyoshi, Hiroshima; Shuji Sanagi; Michio Kado, all of Hiroshima, Japan

[73] Assignee: Mazda Motor Corporation, Hiroshima, Japan

[21] Appl. No.: 489,073

[22] Filed: Mar. 6, 1990

[30] Foreign Application Priority Data

Mar. 6, 1989 [JP] Japan .................................. 1-54203
Mar. 6, 1989 [JP] Japan .................................. 1-54204

[51] Int. Cl.⁵ .......................... B62D 1/16; B62D 1/18
[52] U.S. Cl. ..................................... 74/493; 280/775; 280/777
[58] Field of Search .................. 74/492, 493; 280/775, 280/777, 779

[56] References Cited

U.S. PATENT DOCUMENTS

| | | | |
|---|---|---|---|
| 4,300,407 | 11/1981 | Köpf | 74/534 X |
| 4,330,139 | 5/1982 | Katayama | 74/493 X |
| 4,363,499 | 12/1982 | Watanabe et al. | 74/493 X |
| 4,463,626 | 8/1984 | Kazaoka et al. | 280/775 X |
| 4,733,575 | 3/1988 | Nakamura | 74/493 |
| 4,738,469 | 4/1988 | Ushijima et al. | 74/492 X |
| 4,788,880 | 12/1988 | Kester | 74/493 |

FOREIGN PATENT DOCUMENTS

| | | | |
|---|---|---|---|
| 58557 | 4/1982 | Japan | 74/493 |
| 59-99867 | 7/1984 | Japan | |
| 236875 | 11/1985 | Japan | 74/493 |
| 80155 | 4/1987 | Japan | 74/493 |
| 157863 | 7/1987 | Japan | 74/493 |

Primary Examiner—Allan D. Herrmann
Assistant Examiner—Julie Krolikowski
Attorney, Agent, or Firm—Fleit, Jacobson, Cohn, Price, Holman & Stern

[57] ABSTRACT

A structural arrangement for supporting a tilt steering device includes a steering column into which a steering shaft coupled at one end thereof with a steering wheel, is inserted so as to be rotatable. A lower steering column bracket is attached to the lower end portion of the steering column, and a connecting bracket is attached to the vehicle body, facing the lower steering column bracket. A shaft supports the lower steering column bracket to the connecting bracket so that each bracket is able to rotate with respect to each other. A rotation blocking element is located between the lower steering column bracket and the connecting bracket so that the bracket does not rotate with respect to each other when a force, which is larger than a predetermined force, is applied between each bracket.

14 Claims, 6 Drawing Sheets

STRUCTURAL ARRANGEMENT FOR SUPPORTING A TILT STEERING DRIVE

FIELD OF THE INVENTION

The present invention relates generally to a structural arrangement for supporting a tilt steering device, and more particularly, is directed to an improvement in a structural arrangement for supporting a tilt steering device including a steering wheel and a steering shaft coupled with the steering wheel in an interior cabin of a vehicle.

BACKGROUND OF THE INVENTION

In a steering system of a vehicle, a steering shaft is coupled at one end with a steering wheel by a rim. The steering shaft is usually inserted into a steering column to pass therethrough to be rotatable and the steering column is fixed to a body of the vehicle so as to partially constitute a structural arrangement for supporting a steering shaft and a steering wheel in an interior cabin formed in the body of a vehicle. Such a steering shaft included in the structural arrangement for supporting a tilt steering device is rotatably supported at a lower end on the body. The steering column is supported at its middle portion to a body with a tilt lock since it is movable to different positions in an up-and-down direction so as to be tiltable, as disclosed in Japanese Utility Model specification published before examination under Publication Number 59-99867.

In such a structural arrangement, the lower end of the steering column is rotatably attached by a shaft through a lower bracket to a dash panel bracket. The middle portion of the steering column is attached through an upper steering column bracket to an upper steering bracket by a shaft with a tilt lock.

During a collision of the vehicle, a driver's body is caused to lean forward. It is known that if the driver's body is caught by the steering wheel, the shock is absorbed by the deformation of the steering wheel. For example, when a driver's chest strikes against the steering wheel, a rim of the steering wheel may be deformed to absorb the shock.

When the driver's body is caught by the steering wheel on the occasion of a collision of the vehicle, it is preferable that the steering column is fixed to the vehicle body so that the steering column does not rotate.

However, in such a previously proposed structural arrangement for supporting a tilt steering column and a steering wheel in the interior cabin of a vehicle as described above, since the middle portion of the steering column is supported on the body by a tilt lock so as to be able to change its up-and-down position and the lower end of the steering column is rotatably supported on the body on the occasion of a collision of the vehicle, only the lower end of the steering column is pushed backward and the steering column projects upwardly by rotating forwardly around the tilt lock installed at the middle portion of the steering column.

SUMMARY OF THE INVENTION

It is an object of the present invention to provide an improved structural arrangement for supporting a tilt steering device, which avoids the foregoing problem encountered by the prior art.

According to the present invention, there is provided a structural arrangement for supporting a tilt steering device comprising a steering column into which a steering shaft coupled at one end thereof with a steering wheel is inserted to be rotatable, a lower steering column bracket is attached to the lower end portion of said steering column, a connecting bracket is attached to said vehicle body facing said lower steering column bracket, a shaft supports said lower steering column bracket to said connecting bracket so that each bracket is able to rotate with respect to each other, a rotation blocking means installed between said lower steering column bracket and said connecting bracket so that each bracket does not rotate with respect to each other when a force, which is larger than a predetermined force, is applied between each bracket.

According to the present invention, there is provided another structural arrangement for supporting a tilt steering device comprising a steering column into which a steering shaft coupled at one end thereof with a steering wheel is inserted to be rotatable, an upper steering column bracket is attached to the middle portion of said steering column, an upper steering bracket is attached to a vehicle body facing toward said upper steering column bracket, a tilt shaft supports said upper steering bracket on said upper steering column bracket, a rotation blocking means installed between said upper steering column bracket and said upper steering bracket so that said steering column does not rotate around said tilt shaft.

In the structural arrangements thus described in accordance with the present invention, the lower end portion of the steering column is attached to the vehicle body by the steering shaft to be rotatable around the steering shaft. When the vehicle is involved in a head-on collision and a predetermined force operates on the lower end portion of the steering column, the rotation blocking means blocks the rotation of the lower end portion of the steering column around the steering shaft.

Accordingly, the lower end portion of the steering column is fixed to the vehicle body so as not to rotate around the steering shaft. As a result, the projecting movement of the steering column is avoided when the vehicle is involved in a collision.

The above features and advantages of the present invention will become apparent from the following detailed description which is to be read in conjunction with the accompanying drawings.

DETAILED DESCRIPTION OF THE PREFERRED EMBODIMENTS

A preferred embodiment of the present invention is described hereinafter with reference to the accompanying drawings.

Figure 1:
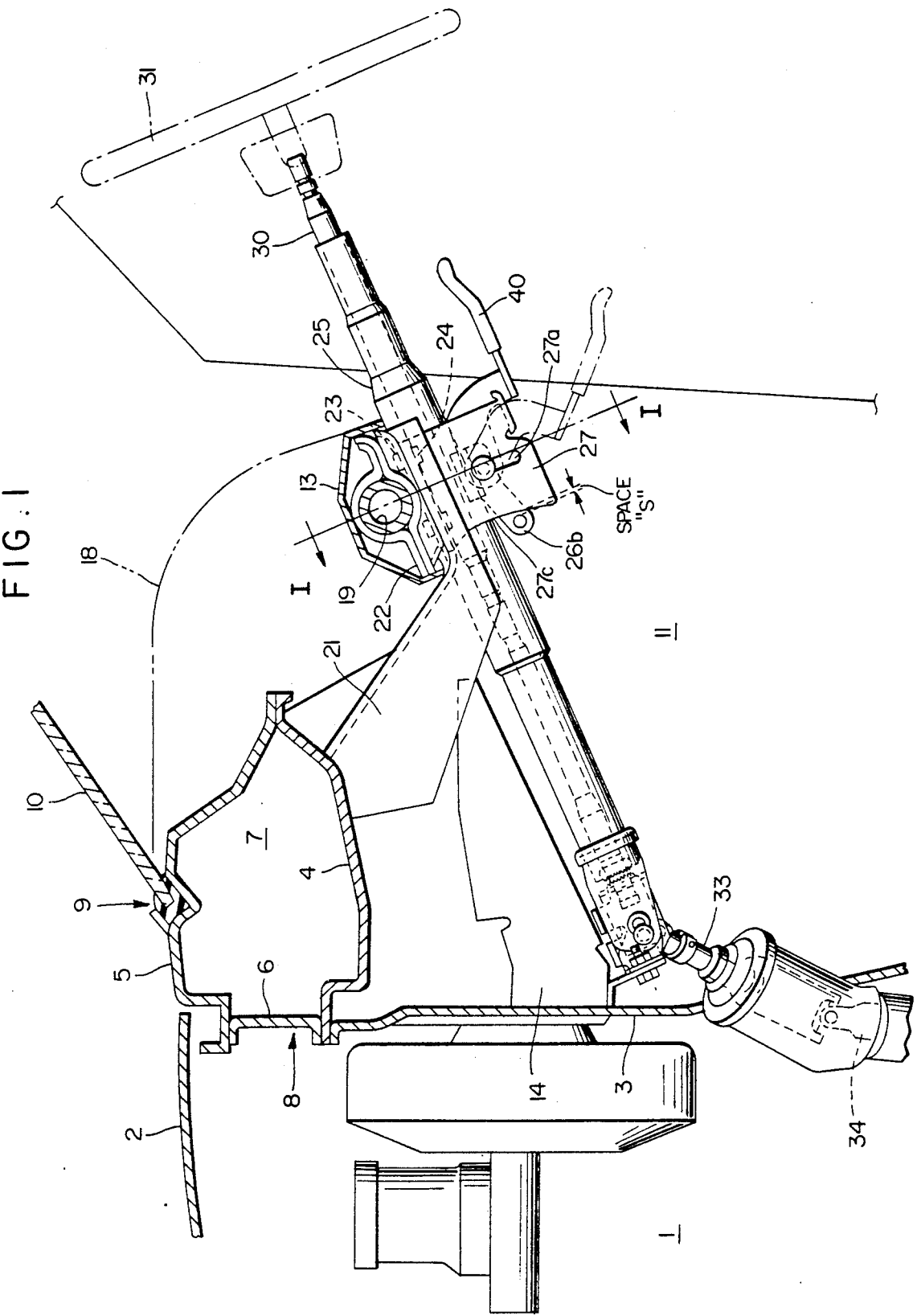
FIG. 1 is a side view showing one embodiment of a structural arrangement for supporting a tilt steering device according to the present invention.

FIG. 1 shows an example of a structural arrangement for supporting a tilt steering device according to the present invention, together with a part of a body of a vehicle to which the tilt steering device is applied.

Referring to FIG. 1, a cowl panel 8 is disposed to extend in the direction of the width of the body of the vehicle between a bonnet 2 and a lower portion of a front windshield 10. An upper dash panel 4 extends from the lower end portion of the cowl panel 8 toward an interior cabin 11 formed in the body. A cowl box 7 extending in the direction of the width of the body is formed with the cowl panel 8, the upper dash panel 4 and an upper cowl panel 5. At the right and left side portions of the body at which both side portions of the cowl box 7 are disposed, cowl side panels are provided. In a pad portion 18 indicated with a dot-and-dash line in FIG. 1, a steering column supporting member 19 is disposed to elongate in the direction of the width of the body with right and left end portions thereof fixed to supporting plates 13 mounted on the cowl side panels, respectively.

A lower dash panel 3 extends downwardly from the connecting portion between the cowl panel 8 and the upper dash panel 4 so as to separate the cabin 11 from an engine room 1. A dash panel bracket 14 is fixed to the surface of the lower dash panel 3 facing the cabin 11, and a brake pedal (not shown) is attached to the dash panel bracket 14 to be able to be swingable.

One end portion of an upper steering bracket 21 is secured to the upper dash panel 4 and the other end portion of the upper steering bracket 21, to which an upper steering column bracket 27 is attached, is connected through a bracket 22 with the steering column supporting member 19 to be supported thereby.

Figure 6:
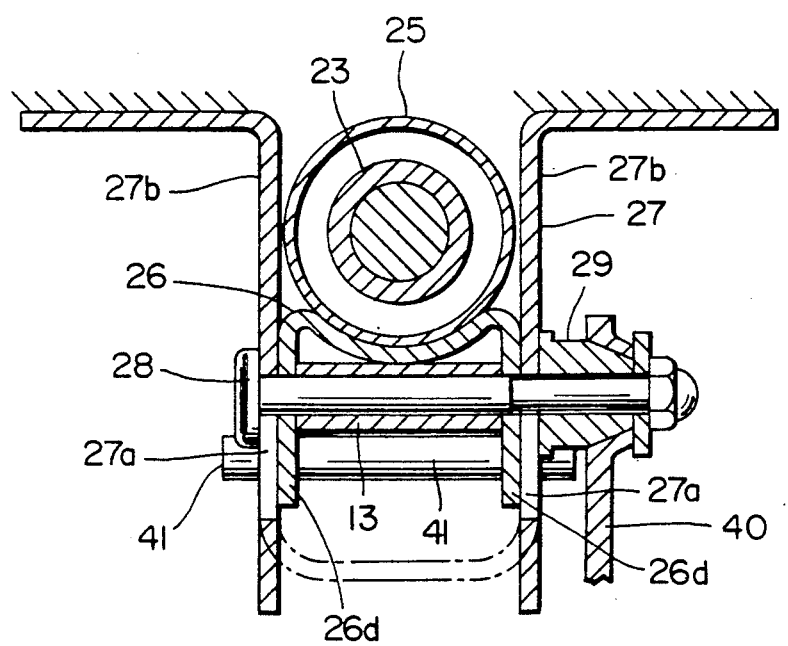
FIG. 6 is a schematic, partial cross-sectional view taken on line I—I of FIG. 1.

FIG. 6 shows a cross-section I—I of FIG. 1. A lower bracket 26 is attached to the steering column 25. The lower bracket 26 has a pair of side walls 26d,26d, and a pair of holes 26a,26a are formed in each wall 26d. The upper steering column bracket 27 has a pair of side walls 27b,27b, and a pair of holes 27a,27a are formed in each wall 27b. A shaft 28 is inserted into the holes 26a,26a, 27a,27a, so that the steering column 25, being attached to the lower bracket 26, is supported to the upper steering column bracket 27.

A pair of plate members 14a,14b are formed downwardly from the dash panel bracket 14 in one body. L-formed connecting brackets 51,52 are fixed to the plate members 14a,14b by bolts 53,54, and nuts 55,56.

Figure 2:
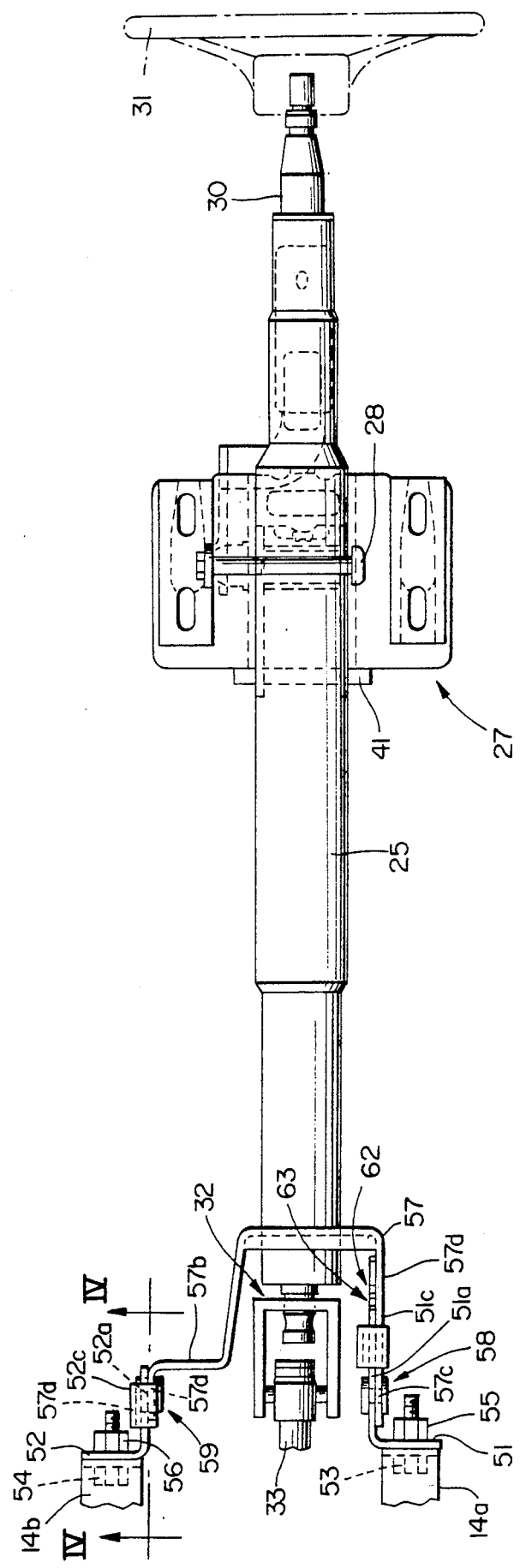
FIG. 2 a plan view of the structural arrangement shown in FIG. 1.
Figure 3:
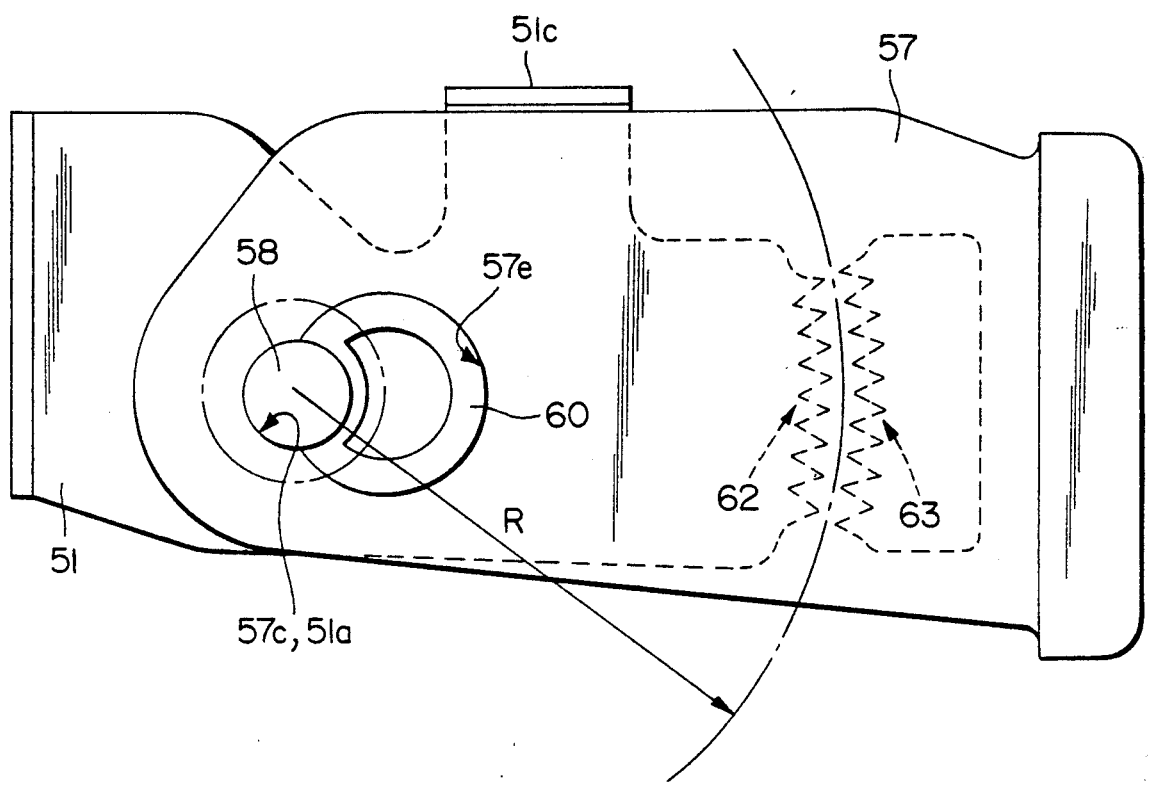
FIG. 3 is a side view showing one embodiment of a rotation blocking means installed between a lower steering column bracket and a connecting bracket, and of a movement permitting means shown in FIG. 1.

A lower steering column bracket 57 is attached to the lower end of the steering column 25. Left and right side plates 57a,57b extend forward from the lower steering column bracket 57, and holes 57c,57d are formed on each side plate 57a,57b of bracket 57 (as shown in FIGS. 2 and 3). Holes 51a,52a are formed on the L-formed connecting brackets 51,52. A supporting shaft 58 is inserted into the holes 51a and 57c, and a supporting shaft 59 is inserted in the holes 52a and 57d so that the lower steering column bracket 57 is rotatably supported around the shafts 58,59 to brackets 51 and 52. Stopper plates 51c,52c extend horizontally from the connecting bracket 51,52 so that the lower steering column bracket 51 does not rotate upwardly about the shafts 58,59 beyond a predetermined stop point.

A steering shaft 30, which is connected at its one end with a steering wheel 31 is inserted into the steering column 25 to pass through the same and to be rotatable therein. The steering shaft 30, which is connected to an intermediate shaft 33 with a universal joint 32, transmits rotations of the steering wheel 31 through the intermediate shaft 33 to a steering gear mechanism (not shown in FIG. 1 and FIG. 2).

The steering column 25 is supported to the upper steering column bracket 27 by the shaft 28 which is inserted into the holes 26a,26b of the lower bracket 26 and the holes 27a,27a of the upper steering column bracket 27 as described above. The holes 27a,27a are elongated holes. A nut 29 is screwed on the end of the shaft 28, and the end of a lever 40 is attached to the nut 29. When the lever 40 is moved downwardly, the binding power of the nut 29 to the shaft 28 is released. The shaft 28 can then move up and down within the elongated holes 27a,27a so the steering column 25 can tilt up and down. When moving the lever 40 upward, the binding power of the nut 29 to the shaft 28 becomes tight and the steering column 25 is fixed in position.

Figure 5:
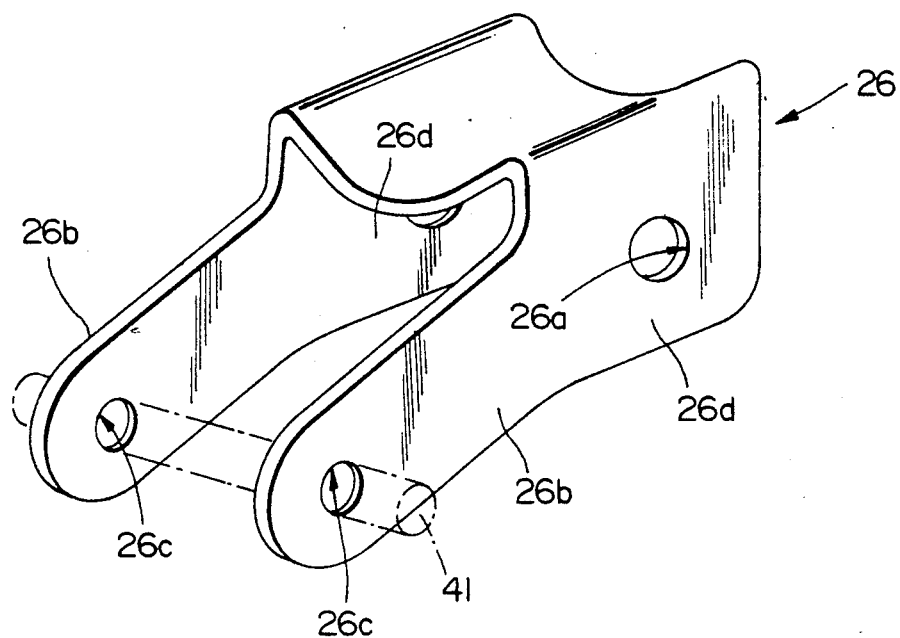
FIG. 5 is a perspective view showing a part of the embodiment shown in FIG. 1.

The lower bracket 26, which is attached to the steering column 25, has a pair of arms 26b,26b as shown in FIG. 5, which extend forward from the sides 26d. The end portions of the arms 26b,26b extend beyond the front edge 27c of the upper steering column bracket 27, as shown in FIG. 1. Holes 26c,26c are formed at each end portion of the arms 26b,26b. A shaft 41 is inserted into the holes 26c,26c. The shaft 41 is longer than the distance between the side walls 27b,27b. There is a space "S" between the shaft 41 and the front edge 27c of the upper steering column bracket 27, as shown in FIG. 1. The space "S" is designed to be 1 to 2 mm.

Accordingly, when the steering column 25 is moved relative to the shaft 28 as the steering wheel 31 is moved upward, both ends of the shaft 41 strike against the front edge 27c of the upper steering column bracket 27 so that continued movement of the steering column 25 in an upward direction is stopped.

The lower steering column bracket 57 is attached to the lower end portion of the steering column 25, and the L-formed connecting brackets 51,52 are fixed to the plate members 14a,14b as described above. The lower steering column bracket 57 is rotatably supported to the L-formed connecting brackets 51,52 with the supporting shafts 58,59. As shown in FIG. 3, a hole 57e is formed on the left side plate 57a, and the hole 57e is located rearwardly of the hole 57c and overlapping the hole 57c. The hole 57e is larger than the hole 57c. A hollow elastic ring 60 is located in the hole 57e, and the supporting shaft 58 is supported in the hole 57c by the elastic ring 60. Only the hole 51a, where the supporting shaft 58 is located, is formed on the L-formed connecting bracket 51.

Figure 4:
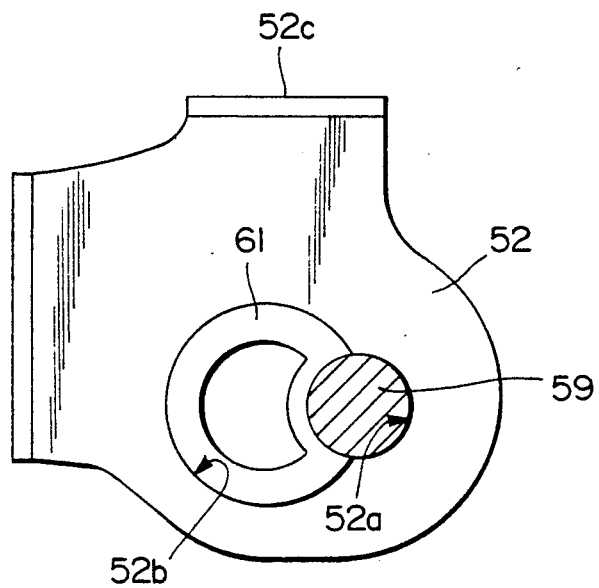
FIG. 4 is a side view showing one embodiment of a movement permitting means shown in FIG. 1.

As shown in FIG. 4, a hole 52b is formed on the L-formed connecting bracket 52, and the hole 52b is located forwardly of the hole 52a and overlapping the hole 52a. The hole 52b is larger than the hole 52a. A hollow elastic ring 61 is located in the hole 52b, and the supporting shaft 59 is supported in the hole 52a by the elastic ring 61. Only the hole 57d, where the supporting shaft 58 is located, is formed on the right side plate 57b.

A gear 62 is formed on the rear end portion of the L-formed connecting bracket 51, and a gear 63 is fixed on the left side panel 57a. The gear 62 and the gear 63 face each other and are separated by a short distance. This short distance is 3 mm. The gears 62,63 are formed to move arcuately around the shaft 58 with a radius R as shown in FIG. 3.

In the case where the vehicle employing the structural arrangement for supporting a tilt steering device as shown in FIG. 1 and described previously in accordance with the present invention is involved in a head-on collision, an engine provided in the engine room 1 is moved toward the cabin 11 and therefore the lower dash panel 3 is shifted toward the rear portion of cabin 11. On such an occasion, when the lower dash panel 3 is moved, the dash panel bracket 14 fixed to the lower dash panel 3 is shifted toward the rear portion of cabin 11. The plate members 14a,14b are thereby also shifted toward the rear portion of cabin 11. The L-formed connecting brackets 51,52 fixed to the plate members 14a,14b receive a force in a direction of the steering shaft 30. If the head-on collision force imparted to the plate members 14a,14b is larger than a predetermined magnitude, the supporting shaft 58 breaks the elastic ring 60 and the supporting shaft 58 moves into the large hole 57e from the hole 57c. The supporting shaft 59 also breaks the elastic ring 61 and the supporting shaft 59 moves into the large hole 52b from the hole 52a. Then, the gear 62 and the gear 63 mesh with each other, so that the lower steering column bracket 57 is fixed to the L-formed connecting bracket 51, that is to say, that the lower steering column bracket 57 is unable to rotate around the supporting shafts 58,59. Accordingly, the movement of the steering column 25 to pivot around the shaft 28 and to move upwardly also is prevented.

Figure 9:
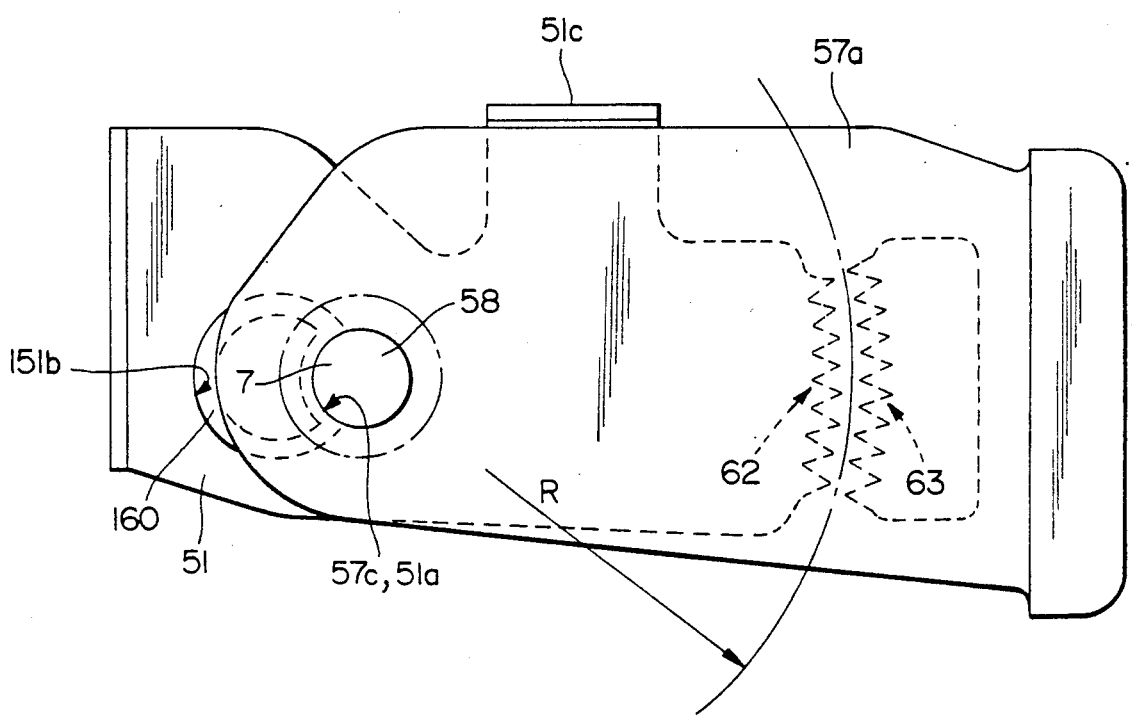
FIG. 9 a side view showing another embodiment of a movement permitting means.

FIG. 9 shows another example of the structural arrangement for supporting a tilt steering device according to the present invention. In FIG. 9, members and portions corresponding to those of FIG. 3 are marked with the same reference numerals and further description thereof will be omitted.

In the example shown in FIG. 9, the hole 51a, where the supporting shaft 58 is located, is formed on the L-formed connecting bracket 51. A hole 151b is formed on the L-formed connecting bracket 51, and the hole 151b is located forward of the hole 51a and overlapping the hole 51a. The hole 151b is larger than the hole 51a. An annular elastic ring 160 is located in the hole 151b, and the shaft 58 is supported in the hole 51a by the elastic ring 160. Only the hole 57c, where the supporting shaft 58 is inserted, is formed on the left side plate 57a.

As described above, it is enough to form the large hole with the elastic ring in one of the brackets 51,57.

Figure 8:
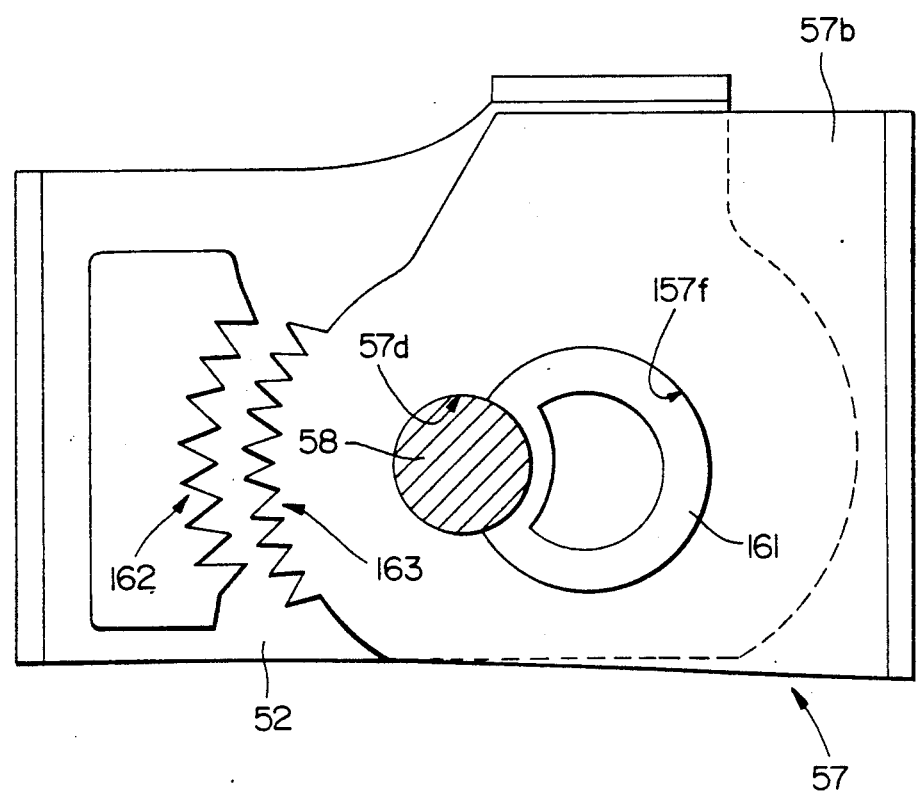
FIG. 8 is a side view showing another embodiment of a rotation blocking means installed between a lower steering column bracket and a connecting bracket, and of a movement permitting means.

FIG. 8 shows another example of the structural arrangement for supporting a tilt steering device according to the preset invention. In FIG. 8, members and portions corresponding to those of FIG. 4 are marked with the same references and a further description thereof will be omitted.

In the example shown in FIG. 8, the hole 57d, where the supporting shaft 58 is located, is formed on the right side plate 57b. A hole 157f is formed on the right side plate 57b, and the hole 157f is located rearwardly of the hole 57d and overlapping the hole 57d. The hole 157f is larger than the hole 57d. An annular elastic ring 161 is located in the hole 157f, and the supporting shaft 58 is supported in the hole 57d by the elastic ring 161. Only the hole 52a, where the supporting shaft 58 is located is formed on the L-formed connecting bracket 52.

A gear 162 is fixed on the L-formed connecting bracket 52, and a gear 163 is formed on the front end portion of the right side plate 57b of the lower steering column bracket 57. The gear 162 and the gear 163 face towards each other and are separated by a short distance. The gears 162,163 are formed arcuately around the shaft 58 with a radius R.

As described above, it is enough to form the large hole with the elastic ring in one of the brackets 52,57. It is sufficient to form the pair of gears on one of the bracket 51,52 and on one of the side plates 57a,57b. Of course, it is more effective to form the pair of gears on both brackets 51,52 and both side plates 57a,57b.

Figure 7:
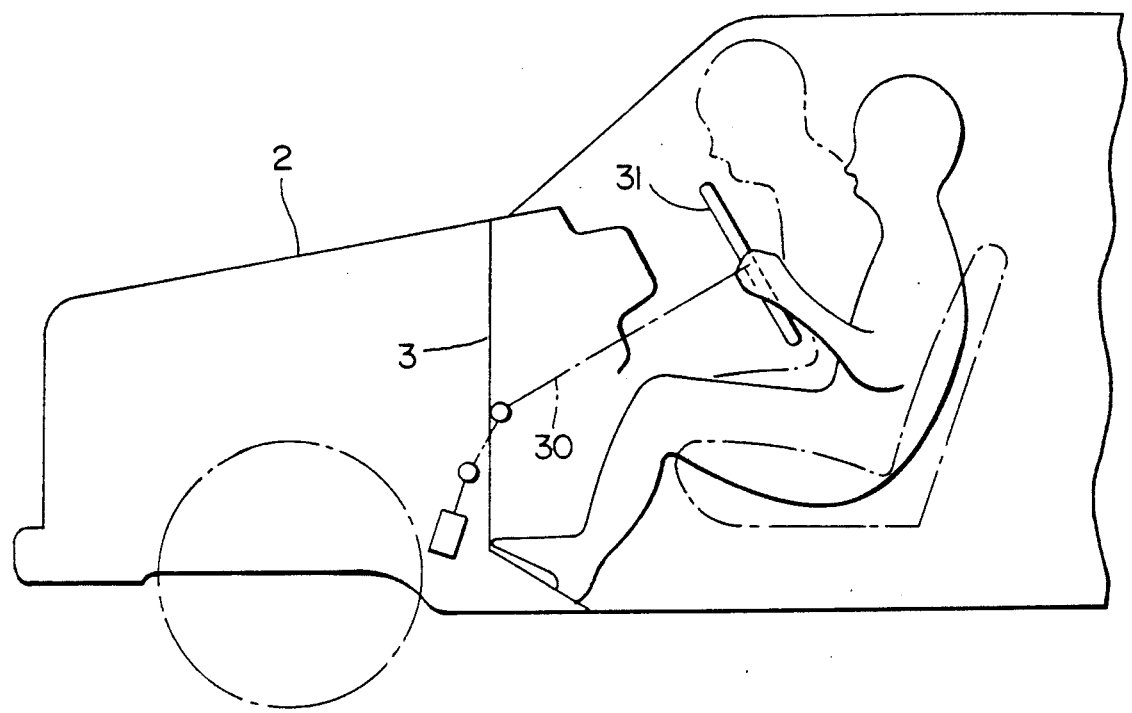
FIG. 7 is a schematic representation showing a position that a driver is moved into to encounter a steering wheel when a vehicle is involved in a head-on collision.

In such a manner as described above, when the vehicle is involved in a head-on collision, the steering column 25 is fixed at the middle portion of the steering column 25 by the shaft 41 and the front edge 27c and also fixed at the lower end of the steering column 25 by gears 62,63 to the vehicle body so that the movement of the steering column to turn around the shaft 28 and to project upwardly is prevented. As an example shown in FIG. 7, when the vehicle is involved in a head-on collision, the driver's body leans forwardly as shown in dotted lines. However, by the present invention the driver's body is received by the steering wheel 31 and the shock on the driver's body from the head-on collision is effectively absorbed with the transformation of the steering wheel.

We claim:

1. A structural arrangement for supporting a tilt steering device of a vehicle body, said structural arrangement comprising:
    a steering column,
    a steering shaft coupled at one end thereof with a steering wheel, said steering shaft being rotatably mounted within said steering column,
    a lower steering column bracket attached to a lower end portion of said steering column,
    a connecting bracket attached to the vehicle body and facing said lower steering column bracket,
    a supporting shaft for supporting said lower steering column bracket to said connecting bracket so that each bracket is able to rotate relatively, and
    rotation blocking means located between said lower steering column bracket and said connecting bracket for preventing relative rotation between said lower steering column bracket and said connecting bracket when a force by which a collapse occurs operates between said lower steering column bracket and said connecting bracket.

2. A structural arrangement according to claim 1, wherein said rotation blocking means includes two gears facing each other so as to mesh together, one of said gears is fixed to said lower steering column bracket and the other of said gears is fixed to said connecting bracket.

3. A structural arrangement according to claim 2, wherein said gears are formed arcuately around said supporting shaft.

4. A structural arrangement according to claim 1, further comprising movement permitting means located between said steering column bracket and said connecting bracket for allowing relative movement of said steering column bracket and said connecting bracket in the direction of the axis of said steering column when a force, larger than the force by which said collapse occurs operates on each bracket.

5. A structural arrangement according to claim 4, wherein said movement permitting means includes a large hole formed in one of said lower steering column bracket and said connecting bracket, and a small hole formed in the other of said lower steering column bracket and said connecting bracket, and said shaft is inserted in said large hole and said small hole.

6. A structural arrangement according to claim 5, wherein said large hole is divided into two portions by partition means for allowing movement of said supporting shaft from said small hole into said large hole when a force greater than said force by which said collapse occurs is exerted on each said bracket.

7. A structural arrangement for supporting a tilt steering device of a vehicle body, said structural arrangement comprising:
   a steering column,
   a steering shaft coupled at one end thereof with a steering wheel, said steering shaft being rotatably mounted within said steering column,
   an upper steering column bracket attached to a middle portion of said steering column,
   an upper steering bracket attached to a vehicle body and facing said upper steering column bracket,
   a tilt shaft supporting said upper steering bracket on said upper steering column bracket, and
   rotation blocking means located between said upper steering column bracket and said upper steering bracket for preventing rotation of said steering column around said tilt shaft, said rotation blocking means including stop means fixed to one of said upper steering column bracket or said upper steering bracket and receiving means fixed to the other for receiving said stop means.

8. A structural arrangement according to claim 7, wherein said stop means includes a rod disposed to extend in a direction of a width of the vehicle body and fixed to said upper steering column bracket, and said receiving means includes an edge of said upper steering bracket.

9. A structural arrangement according to claim 7, further comprising:
   a lower steering column bracket attached to a lower end portion of said steering column,
   a connecting bracket attached to said vehicle body and facing toward said lower steering column bracket,
   a supporting shaft for supporting said lower steering column bracket on said connecting bracket so that each bracket is able to rotate relative to each other,
   under-rotation blocking means located between said lower steering column bracket and said connecting bracket for preventing relative rotation when a force by which a collapse occurs operates between said lower steering column bracket and said connecting bracket.

10. A structural arrangement according to claim 9, wherein said under-rotation blocking means includes two gears facing each other so as to mesh together, one of said two gears is fixed to said lower steering column bracket and the other of said two gears is fixed to said connecting bracket, and said under-rotation blocking means includes a rod extending in a direction of a width of the vehicle body fixed to said upper steering column bracket, and with an edge of said upper steering bracket located between said lower steering column bracket and said connecting bracket so that each bracket is able to move relatively in a direction of an axis of said steering column when the force operating between said lower steering column bracket and said connecting bracket is larger than the force by which said collapse occurs.

11. A structural arrangement according to claim 10, wherein said gears are formed arcuately around said supporting shaft, and said edge of said upper steering bracket is formed around said shaft.

12. A structural arrangement according to claim 9, further comprising movement permitting means located between said lower steering column bracket and said connecting bracket so that each bracket is able to move relatively in the direction of the axis of said steering column when the force which operates on each bracket is larger than the force by which said collapse occurs.

13. A structural arrangement according to claim 12, wherein said movement permitting means includes a large hole formed in one of said lower steering column bracket and said connecting bracket, and a small hole formed in the other of said lower steering column bracket and said connecting bracket, and said shaft is inserted in said large hole and said small hole.

14. A structural arrangement according to claim 13, wherein said large hole is divided into two portions by partition means for allowing movement of said shaft from said small hole into said large hole when a force which is greater than said force by which said collapse occurs is exerted on each said bracket.

* * * * *